(12) United States Patent
Tkachuk

(10) Patent No.: US 9,069,804 B2
(45) Date of Patent: Jun. 30, 2015

(54) SYSTEM AND A METHOD FOR GENERATING DATABASE MODEL FOR ANALYSIS OF APPLICATIONS

(75) Inventor: Oksana I. Tkachuk, Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 983 days.

(21) Appl. No.: 12/831,730

(22) Filed: Jul. 7, 2010

(65) Prior Publication Data

US 2012/0011168 A1   Jan. 12, 2012

(51) Int. Cl.
*G06F 17/30* (2006.01)
*G06F 11/36* (2006.01)

(52) U.S. Cl.
CPC ...... *G06F 17/30294* (2013.01); *G06F 11/3604* (2013.01)

(58) Field of Classification Search
CPC ............ G06F 17/30286; G06F 17/30067; G06F 17/30595
USPC ................... 707/792, 803, 769, 602
See application file for complete search history.

(56) References Cited

U.S. PATENT DOCUMENTS

| 5,737,607 | A  | * | 4/1998 | Hamilton et al. | 719/316 |
| 8,326,902 | B2 | * | 12/2012 | McArdle et al. | 707/679 |
| 2005/0125747 | A1 | * | 6/2005 | Nelson et al. | 716/1 |
| 2009/0089810 | A1 | * | 4/2009 | Tkachuk et al. | 719/320 |
| 2010/0198730 | A1 | * | 8/2010 | Ahmed et al. | 705/50 |
| 2011/0082889 | A1 | * | 4/2011 | McArdle et al. | 707/792 |

\* cited by examiner

*Primary Examiner* — Belix M Ortiz Ditren
(74) *Attorney, Agent, or Firm* — Baker Botts L.L.P.

(57) ABSTRACT

In accordance with a particular embodiment of the present invention, a method for generating a database model may include analyzing database configuration data for a database. The method may further include analyzing one or more database application programming interfaces for accessing the database. The method may also include generating one or more stubs based on the analyses, the one or more stubs configured to, when executed, model the database as if the database were populated with data.

18 Claims, 2 Drawing Sheets

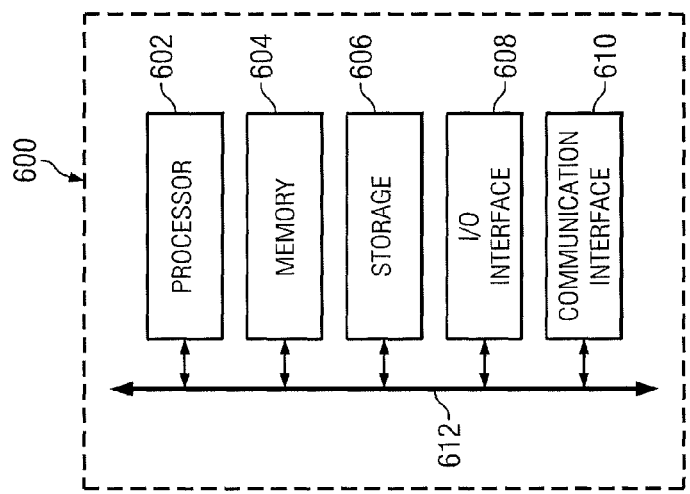
*FIG. 5*
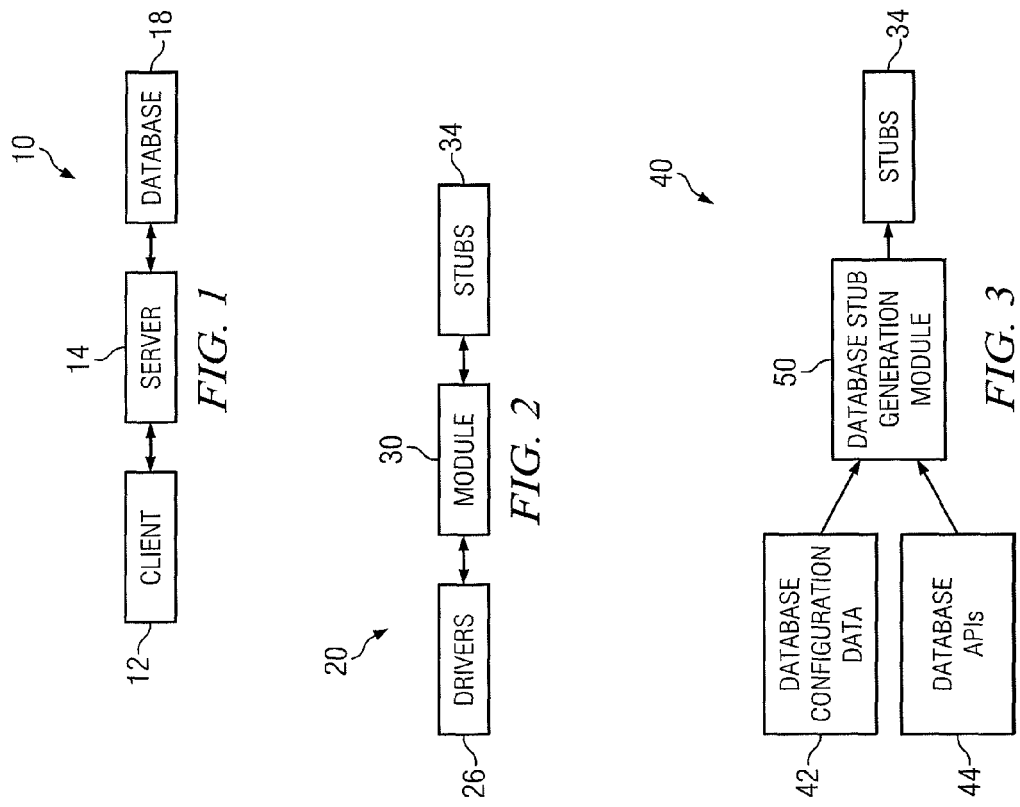
*FIG. 1*
*FIG. 2*
*FIG. 3*

```
<hibernate-mapping auto-import="true"
default-lazy="false">
  <class
    name="roseindia.dao.hibernate.Login"
    table="login"
  />
  <property
    name="loginid"
    type="java.lang.String"
    not-null="true"
  />
  <property
    name="password"
    type="java.lang.String"
    not-null="true"
  />
```

42

```
public class ApplDB   extends AbstractApplDB {
    private Map<String, String> nameMap = new HashMap<String, String>();
    private Map<String, List<Object>> dataMap = new HashMap<String, List<Object>>();
    public void populateData() {
        ArrayList<Object> dataItemList = new ArrayList<Object>();
        nameMap.put("roseindia.dao.hibernate.Login", "login");
        dataItemList = new ArrayList<Object>();
        Login Login0 = new Login();
        Login0.setLoginid("loginid0");
        Login0.setPassword("password0");
        ...
        dataMap.put("login", dataItemList);
```

SYSTEM AND A METHOD FOR GENERATING DATABASE MODEL FOR ANALYSIS OF APPLICATIONS

TECHNICAL FIELD OF THE INVENTION

This invention relates generally to the field of software verification and, more specifically, to a system and a method for generating a database model for analysis of database applications.

BACKGROUND OF THE INVENTION

Formal verification techniques usually work for closed homogeneous non-distributed applications. For example, taking Java as an example language and model checking as an example verification method, Java model-checking techniques work for programs that are self-executable, written in pure Java and ready to run on a single Java Virtual Machine (JVM). However, there are many applications that are open, heterogeneous, and distributed in nature, e.g., web applications, which are: 1) driven by an end user; 2) comprised of artifacts written in many languages (e.g., Java, JavaScript, HTML, and XML); and/or 3) deployed in a distributed environment, with client, server, and database potentially residing on different machines. To apply Java model-checking techniques, all non-Java components (including a user) need to be represented as pure Java implementations. In addition, the distributed nature of applications needs to be dealt with so that the resulting Java program is non-distributed but preserves all of the relevant behaviors of the original application. As with all such processing operations, of critical importance are issues relating to speed, accuracy, and automation.

SUMMARY OF THE INVENTION

The present invention provides a method and a system for generating a database model for analysis of database applications that substantially eliminates or reduces at least some of the disadvantages and problems associated with previous methods and systems.

In accordance with a particular embodiment of the present invention, a method for generating a database model may include analyzing database configuration data for a database. The method may further include analyzing one or more database application programming interfaces for accessing the database. The method may also include generating one or more stubs based on the analyses, the one or more stubs configured to, when executed, model the database as if the database were populated with data.

Technical advantages of particular embodiments of the present invention include a methodology that produces stubs to model a database, wherein such stubs can be thought of as test harnesses that can be used by several technologies such as model-checking, symbolic execution, static analysis, and testing.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 1 is a simplified block diagram illustrating an example web applications domain, in accordance with certain embodiments of the present disclosure;

FIG. 2 is a simplified block diagram illustrating an example environment generation for web applications in accordance with certain embodiments of the present disclosure;

FIG. 3 is a simplified block diagram illustrating a system for generation of stubs with a database stub generation model, in accordance with certain embodiments of the present disclosure;

FIG. 4 depicts an example file database configuration file and code for a stub generated based on such database configuration file, in accordance with certain embodiments of the present disclosure; and FIG. 5 illustrates an example computer system, in accordance with the present disclosure.

DETAILED DESCRIPTION OF THE INVENTION

FIG. 1 is a simplified diagram illustrating an example web applications domain 10, in accordance with certain embodiments of the present disclosure. FIG. 1 includes a client 12, a database 18, and a server 14 (e.g., a J2EE server). Components of web applications domain 10 may execute or operate within one or more computer systems, such as those described in more detail below with reference to FIG. 5.

In accordance with the present disclosure, an environment generation for web applications may be created. An example methodology for creation of an environment generation is described in co-pending application U.S. Ser. No. 11/865,435, which is incorporated herein by reference in its entirety. Such a methodology can transform open heterogeneous distributed web applications, partially written in Java, into closed homogeneous non-distributed Java programs, ready to be analyzed by formal verification techniques (e.g., such as Java model-checking).

The technique provides for the generation of drivers and stubs. Driver generation produces a Java implementation of a user component, along with setting up the event-handling mechanism of web applications, done at deployment. Stub generation can replace actual components, such as database and J2EE components, with Java implementations that preserve important behaviors, but that run in a non-distributed program. Once drivers and stubs are generated, they are combined with the original application-specific code base (excluding original libraries) to produce a closed homogeneous non-distributed Java program.

There is a multitude of advantages to using such an approach. For example, the tendered methodology can be packaged as a stand-alone tool. In addition, the tools can be configured and extended based on specific domains. Thus, the tools can be applied to a variety of applications. Also, the method produces drivers and stubs, which can be thought of as test harnesses that can be used by several technologies such as model-checking, static analysis, and testing.

Turning back now to FIG. 1, the term 'open' refers to a situation in which a user component drives the application through a web browser, applet, or a Graphical User Interface (GUI). The term 'heterogeneous' refers to the fact that, in addition to Java, many other languages are used, e.g., HTML, JavaScript, PHP, Perl, etc. In the context of the present invention, 'complex' connotes a multiple-layered architecture, typically distributed in nature, where a major part of the application is generated at deployment, according to deployment descriptor files.

Such methodology may generate a closed homogeneous non-distributed Java application from open heterogeneous distributed applications, partially written in Java. The environment generation for such applications can be packaged as a stand-alone tool, which can be used in combination with model-checking, static analysis, and testing. Such environment generation for model-checking Java implementations of open heterogeneous distributed applications is not currently accounted for in existing systems.

Given a module under analysis as a collection of Java classes (e.g., an application-specific code base, excluding reusable libraries), environment generation produces the module's drivers and stubs. Drivers are Java classes that hold a thread of control and usually make calls to the module. The remaining environment classes are called stubs. In the domain of web applications, the drivers simulate end users and stubs model back-end components such database and J2EE libraries.

FIG. 2 is a simplified block diagram illustrating an example environment generation 20 for web applications, in accordance with certain embodiments of the present disclosure. FIG. 2 includes a set of drivers 26, a module 30 (e.g., which may include servlets, enterprise Java beans (EJBs), and/or other components to simulate execution of a web application), and a set of stubs 34 (e.g., which may include java.sql components and/or other suitable components for modeling a database such as database 18, for example). Module 30 is coupled to a database, which can include any items necessary for executing the operations of the present invention. Components of environment generation 20 may execute or operate within one or more computer systems, such as those described in more detail below with reference to FIG. 5.

Application code, which is code typically written by developers of web applications, may be included within module 30 of FIG. 2. Drivers 26 may simulate items that happen during deployment time (e.g., setting up event handlers of the application) and user actions. The generation of drivers 26 is beyond the scope of this disclosure. However, methodologies for generating drivers 26 are discussed in co-pending application U.S. Ser. No. 11/865,435.

FIG. 3 is a simplified block diagram illustrating a system 40 for generation of database stubs 34 with a database stub generation model 50, in accordance with certain embodiments of the present disclosure. Components of system 40 may execute or operate within one or more computer systems, such as those described in more detail below with reference to FIG. 5. As shown in FIG. 3, database stub generation module 50 may analyze database configuration data 42 and database APIs 44 and based on such analyses, generate stubs 34.

Database configuration data 42 may be any file setting forth configuration parameters for a database (e.g., database 18). Such configuration parameters may include any information regarding the database (e.g., its tables, columns, and the types of data entries they hold). In some embodiments, configuration parameters may be embodied in one or more Extensible Markup Language (XML) files, such as depicted in configuration data 42 of FIG. 4.

Database APIs 44 may be one or more application program interfaces implemented by software that allow a web application (e.g., a web application configured to execute on server 14) to perform database-related functions (e.g., functions to get a table from a database, get a column or row from a database; write to a database, etc.). In certain embodiments, database APIs may comprise one or more Structured Query Language (SQL) databases.

As described above, database stub generation module may analyze database configuration data 42 and database APIs 44 and based on such analyses, generate stubs 34. For example, as depicted in FIG. 4, the database configuration data 42 describes a database that contains a table called "login", with data records of type "Login", with fields called "loginid" and "password". The database stub generation module 50 may analyze configuration data 42 and create stubs 34 with a database populated with a table called "login", holding records of type "Login". The database data values (e.g., "loginid" and "password") are generated using concrete values (e.g., "loginid0" and "password0") or using symbolic values (e.g., STRING_SYMBOLIC). Symbolic values can be interpreted by symbolic execution techniques, which can in turn generate interesting concrete values.

The database stub generation module 50 may be parameterized by user-provided values, for example, the number of records to create per data type, the type of data values to generate (e.g., concrete or symbolic) etc.

In these scenarios, advantageous environment generation techniques for web applications may be provided. An open system that is distributed (and not necessarily written in Java, as other languages can readily be used) can transform this data such that the final resultant is a homogenous, non-distributed pure Java program that is ready to be run by existing Java analysis techniques such as model-checking, symbolic execution, static analysis, and testing.

FIG. 5 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Although the present invention has been described in detail with specific components being identified, various changes and modifications may be suggested to one skilled in the art and, further, it is intended that the present invention encompass any such changes and modifications as clearly falling within the scope of the appended claims.

Note also that, with respect to specific process flows disclosed, any steps discussed within the flows may be modified, augmented, or omitted without departing from the scope of the invention. Additionally, steps may be performed in any suitable order, or concurrently, without departing from the scope of the invention.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A method for generating a database model, comprising:
   analyzing database configuration data for a database;
   analyzing one or more database application programming interfaces for accessing the database;
   generating one or more stubs based on the analyses, the one or more stubs configured to model the database as if the database were populated with data; and
   combining the one or more stubs with a code base for an application under test in order to produce a homogeneous non-distributed application for analyzing the application under test.

2. A method according to claim 1, wherein the configuration data is set forth in Extensible Markup Language code.

3. A method according to claim 1, wherein the one or more database application programming interfaces comprise one or more Structured Query Language (SQL) databases.

4. A method according to claim 1, wherein the one or more stubs are set forth in Java code.

5. A method according to claim 1, wherein the application under test is a web application.

6. A method according to claim 1, wherein the non-distributed application is set forth in Java code.

7. A computer-readable medium have embodied thereon a program of instructions configured to, when executed:
   analyze database configuration data for a database;
   analyze one or more database application programming interfaces for accessing the database;

generate one or more stubs based on the analyses, the one or more stubs configured to model the database as if the database were populated with data; and combine the one or more stubs with a code base for an application under test in order to produce a homogeneous non-distributed application for analyzing the application under test.

8. A computer-readable medium according to claim 7, wherein the configuration data is set forth in Extensible Markup Language code.

9. A computer-readable medium according to claim 7, wherein the one or more database application programming interfaces comprise one or more Structured Query Language (SQL) databases.

10. A computer-readable medium according to claim 7, wherein the one or more stubs are set forth in Java code.

11. A computer-readable medium according to claim 7, wherein the application under test is a web application.

12. A computer-readable medium according to claim 7, wherein the non-distributed application is set forth in Java code.

13. A system, comprising:
a processor;
a non-transitory computer-readable medium communicatively coupled to the processor, the non-transitory computer readable medium having stored thereon:
a database coupled to a database stub generation module;
the database stub generation module configured to:
analyze database configuration data for a database;
analyze one or more database application programming interfaces for accessing the database;
generate one or more stubs based on the analyses, the one or more stubs configured to model the database as if the database were populated with data; and
combine the one or more stubs with a code base for an application under test in order to produce a homogeneous non-distributed application for analyzing the application under test.

14. A system according to claim 13, wherein the configuration data is set forth in Extensible Markup Language code.

15. A system according to claim 13, wherein the one or more database application programming interfaces comprise one or more Structured Query Language (SQL) databases.

16. A system according to claim 13, wherein the one or more stubs are set forth in Java code.

17. A system according to claim 13, wherein the application under test is a web application.

18. A system according to claim 13, wherein the non-distributed application is set forth in Java code.

* * * * *